(12) United States Patent
Cho et al.

(10) Patent No.: US 7,011,416 B2
(45) Date of Patent: Mar. 14, 2006

(54) PROJECTION TELEVISION

(75) Inventors: Nam-Il Cho, Suwon (KR); Sung-ki Min, Suwon (KR); Young-tai Kim, Yongin (KR); Soon-woo Lim, Suwon (KR); Hyung-sik Jang, Suwon (JP); Soon-haeng Heo, Suwon (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/652,209

(22) Filed: Sep. 2, 2003

(65) Prior Publication Data

US 2004/0090603 A1    May 13, 2004

(30) Foreign Application Priority Data

Aug. 31, 2002   (KR) .................. 10-2002-0052296

(51) Int. Cl.
G03B 21/00 (2006.01)
G03B 21/20 (2006.01)
H04N 5/645 (2006.01)
H04N 5/655 (2006.01)

(52) U.S. Cl. .................. 353/119; 353/74; 348/778; 348/787; 348/789

(58) Field of Classification Search .......... 353/37, 353/72, 73, 74–78, 79, 80, 98, 99, 119; 348/778–789, 348/836, 843; 359/460, 456–458; G03B 21/20; H04N 5/645, 5/655
See application file for complete search history.

(56) References Cited

U.S. PATENT DOCUMENTS

| 4,394,681 A | * | 7/1983 | Rowe ...................... 348/788 |
| 4,701,801 A | * | 10/1987 | Hobbins et al. ........... 348/819 |
| 5,559,564 A | * | 9/1996 | Nomura .................... 348/779 |
| 5,808,704 A | * | 9/1998 | Yoshikawa et al. ........ 348/748 |
| 6,412,952 B1 | | 7/2002 | Jung ......................... 353/74 |
| 6,545,729 B1 | * | 4/2003 | Lowe ........................ 348/836 |
| 6,616,283 B1 | * | 9/2003 | Takano et al. ............. 353/74 |
| 6,661,473 B1 | * | 12/2003 | Teshima et al. ........... 348/787 |
| 6,833,880 B1 | * | 12/2004 | Chen ........................ 348/787 |
| 2002/0024639 A1 | | 2/2002 | Jung ......................... 353/74 |
| 2004/0041953 A1 | * | 3/2004 | Jung ......................... 348/787 |
| 2004/0114058 A1 | * | 6/2004 | Lim .......................... 348/787 |

FOREIGN PATENT DOCUMENTS

CN     1340966     3/2002

OTHER PUBLICATIONS

Merriam-Webster's Collegiate Dictionary, Tenth Edition, 2001, pg 244.*

* cited by examiner

*Primary Examiner*—W.B. Perkey
*Assistant Examiner*—Andrew Sever
(74) *Attorney, Agent, or Firm*—Staas & Halsey LLP

(57) ABSTRACT

A projection television having a CRT assembly projecting image beams and front and rear casings, respectively provided in a front and a back of the CRT assembly, and further having a pair of CRT brackets provided between the front and rear casings, to support the CRT assembly. The CRT bracket is made of a conductive metallic material, thereby reducing deformation and deterioration because of changes in temperature and humidity, discharging heat generated from the CRT assembly, and blocking EMI.

18 Claims, 6 Drawing Sheets

PROJECTION TELEVISION

CROSS-REFERENCE TO RELATED APPLICATIONS

This application claims the benefit of Korean Patent Application No. 2002-52296, filed Aug. 31, 2002, in the Korean Intellectual Property Office, the disclosure of which is incorporated herein by reference.

BACKGROUND OF THE INVENTION

1. Field of the Invention

The present invention relates to a projection television, and more particularly, to a projection television using a CRT (Cathode-Ray Tube) assembly to project image beams, and front and rear casings covering the CRT assembly.

2. Description of the Related Art

Generally, a projection television includes a CRT assembly projecting image beams, a reflecting mirror reflecting the projected beams, and a screen displaying pictures based on the reflected beams.

Since this type of projection television is commonly equipped with a large-sized screen, it is voluminous and expensive.

As shown in FIGS. 1 and 2, a conventional projection television 101 comprises front and rear casings 110 and 120 forming an external appearance, a wooden support casing 130 provided between the front casing 110 and the rear casing 120, a CRT (cathode ray tube) assembly 140 coupled with the support casing 130 and projecting image beams, a reflecting mirror 121 reflecting the projected image beams, a screen 112 displaying pictures thereon based on the beams reflected by the reflecting mirror 121, a multiplicity of speakers (not shown) provided in the lower part of the front casing 110 mounted with the screen 121, and a circuit board 160 provided in the lower part of the support casing 130 and controlling the CRT assembly 140.

In the conventional projection television with this configuration, image beams projected from the CRT assembly 140 are reflected by the reflecting mirror 121 and then transferred to the screen 112, thereby forming pictures on the screen 112.

In this conventional projection television, however, the support casing 130 supporting the CRT assembly 140 and partially forming the external appearance is made of wood, which is sensitive to temperature and humidity. Hence, the support casing 130 is likely to be deformed or deteriorated because of changes in temperature and humidity, thereby decreasing the longevity of the projection television.

Further, in the conventional projection television, the support casing 130 is manufactured with a heavy compressed wood product to attempt to maintain the integrity and stability thereof. Hence, the projection television is heavy, and difficult to transport.

Still further, in the conventional projection television, the support casing 130 is manually assembled by means of screws, adhesives, etc. Hence, the projection television is structurally complicated, thereby increasing the production cost. Further, since the support casing 130 is usually pre-assembled by a lumber dealer or maker, etc., a large space must be dedicated for transportation and storage, thereby further increasing the cost of manufacturing.

SUMMARY OF THE INVENTION

Accordingly, it is an aspect of the present invention to provide a projection television whose weight and structure are respectively reduced and simplified, thereby facilitating transportation and decreasing the costs of production.

It is another aspect of the present invention to provide a projection television, in which a wooden part is replaced with a molded part, thereby reducing deformation or deterioration because of changes in temperature and humidity.

Additional aspects and advantages of the invention will be set forth in part in the description which follows and, in part, will be obvious form the description, or may be learned by practice of the invention.

The foregoing and/or other aspects of the present invention are achieved by providing a projection television having a CRT assembly projecting image beams, front and rear casings, respectively provided in a front and a back of the CRT assembly, and a pair of CRT brackets, provided between the front and rear casings, that support the CRT assembly.

According to an aspect of the invention, the projection television further comprises a lower casing provided between the front and rear casings. The CRT bracket is connected to the lower casing.

According to an aspect of the invention, the CRT bracket includes: a CRT combination part connected to the CRT assembly, and disposed slantly in correspondence with a projecting angle of the image beams from the CRT assembly; and a CRT supporting rib provided in a lower part of the CRT combination part, and supporting the CRT combination part.

According to an aspect of the invention, the lower casing includes a bracket supporting part combined with a lower end of the CRT supporting rib.

According to an aspect of the invention, the CRT supporting rib is combined to the front casing.

According to an aspect of the invention, the CRT bracket is made of a conductive material to block EMI.

According to an aspect of the invention, the CRT bracket is made of plastic.

According to an aspect of the invention, the lower casing is made of a conductive material to block EMI.

According to an aspect of the invention, the lower casing is made of plastic.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
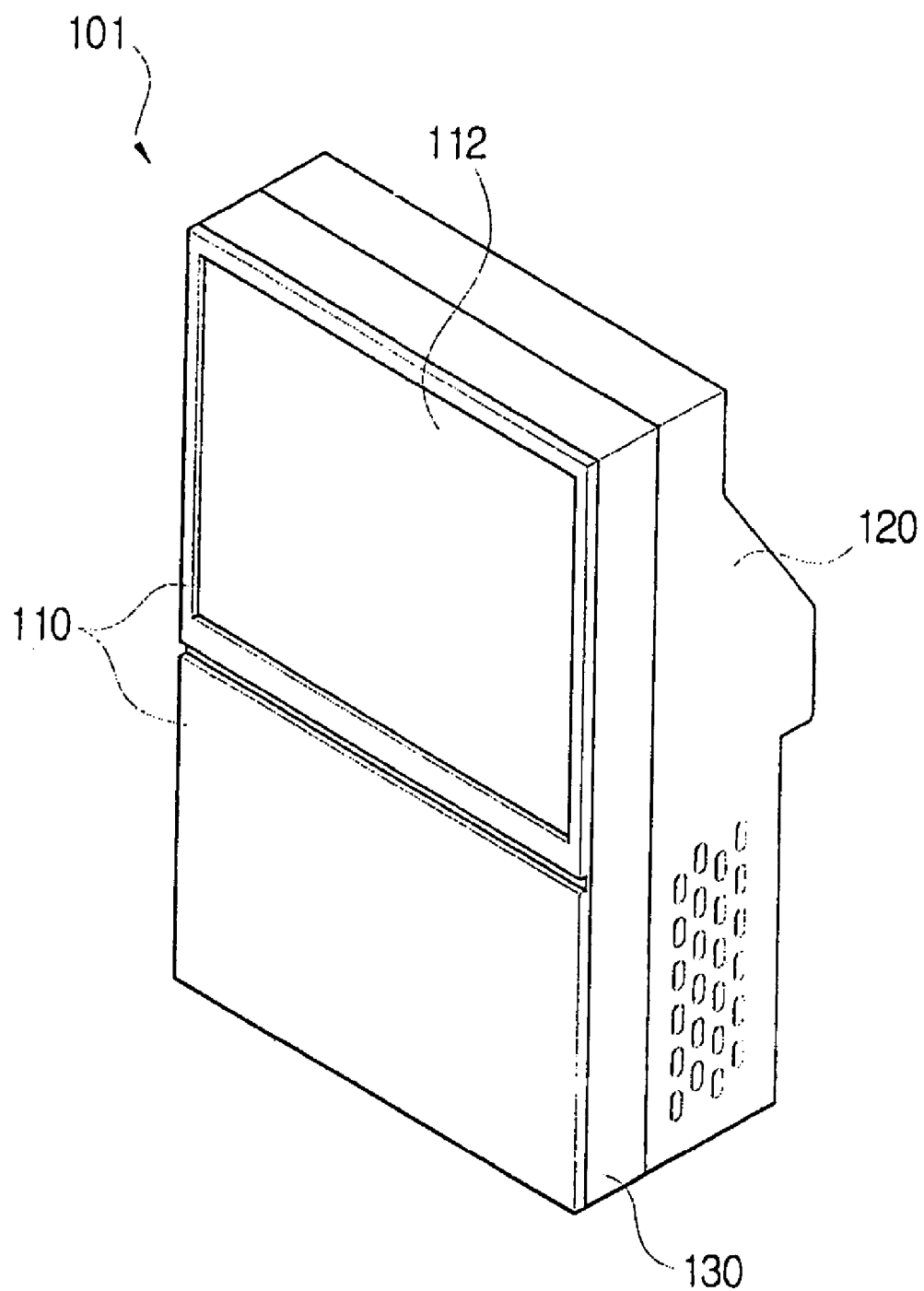
FIG. 1 is a perspective view of a conventional projection television.
Figure 2:
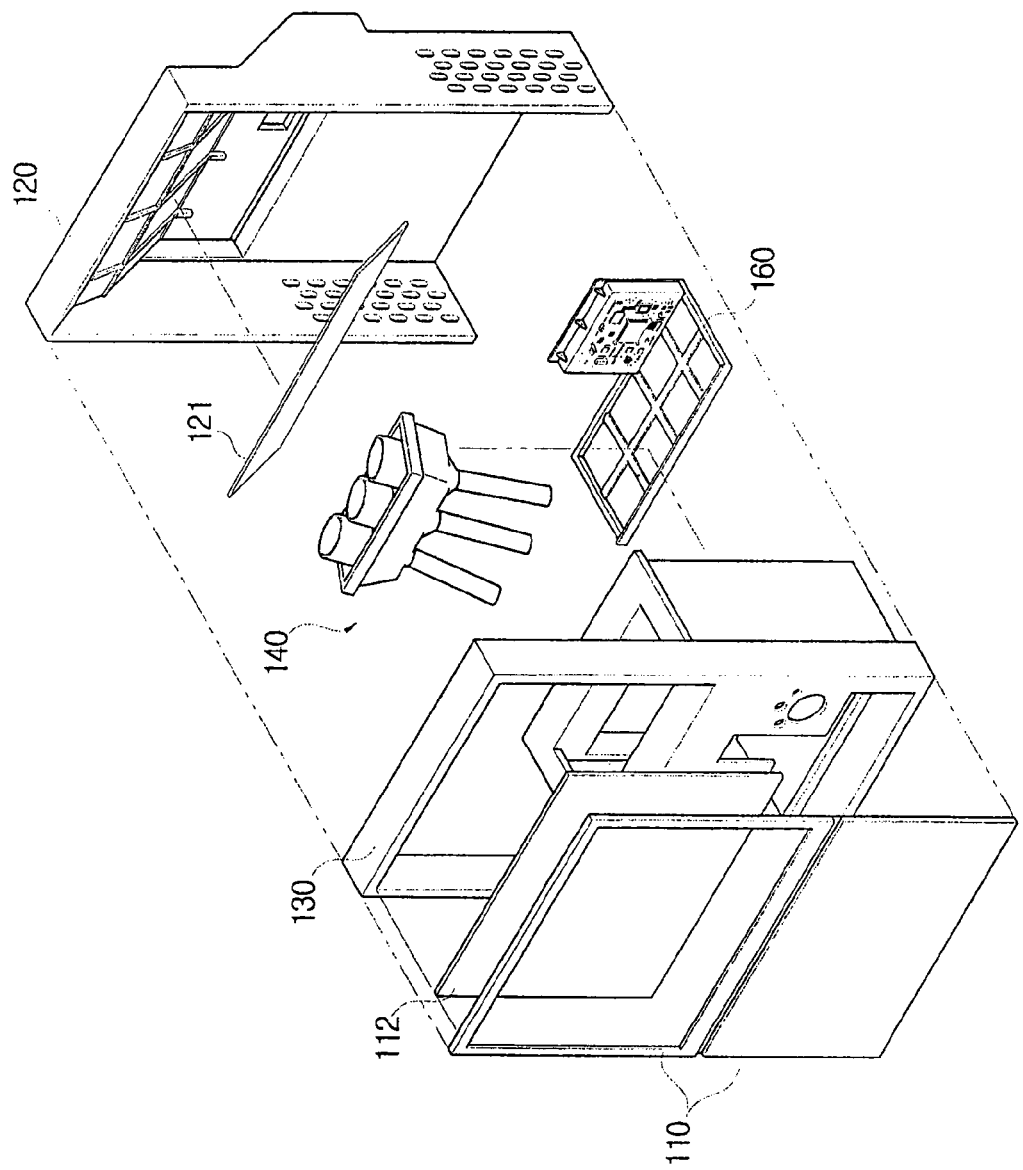
FIG. 2 is an exploded perspective view of the projection television of FIG. 1.

Reference will now be made in detail to embodiments of the present invention, examples of which are illustrated in the accompanying drawings, wherein like reference numerals refer to like elements throughout. The embodiments are described below in order to explain the present invention by referring to the figures.

Figure 3:
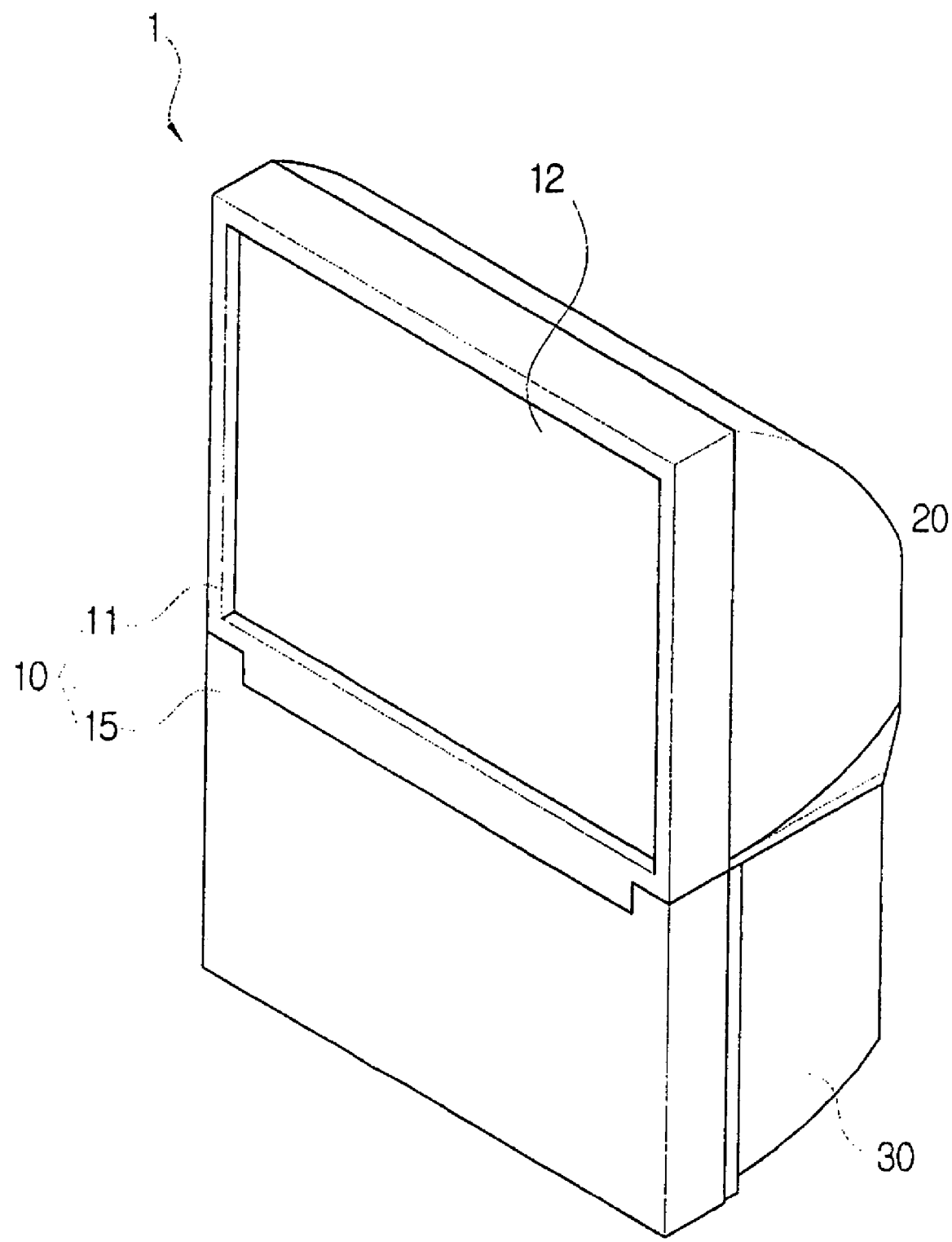
FIG. 3 is a perspective view of a projection television according to an embodiment of the present invention.
Figure 4:
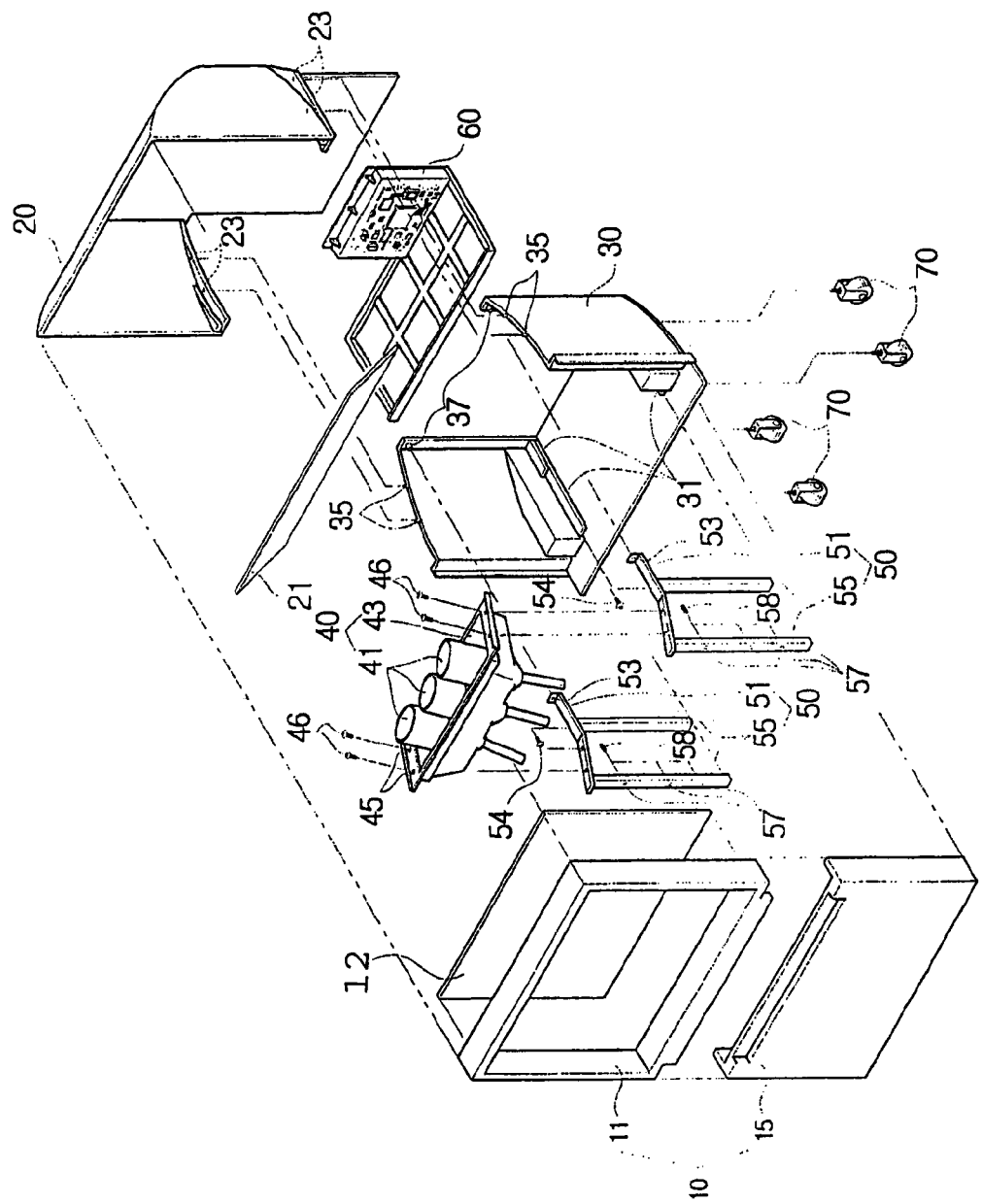
FIG. 4 is an exploded perspective view of the projection television of FIG. 3.
Figure 5:
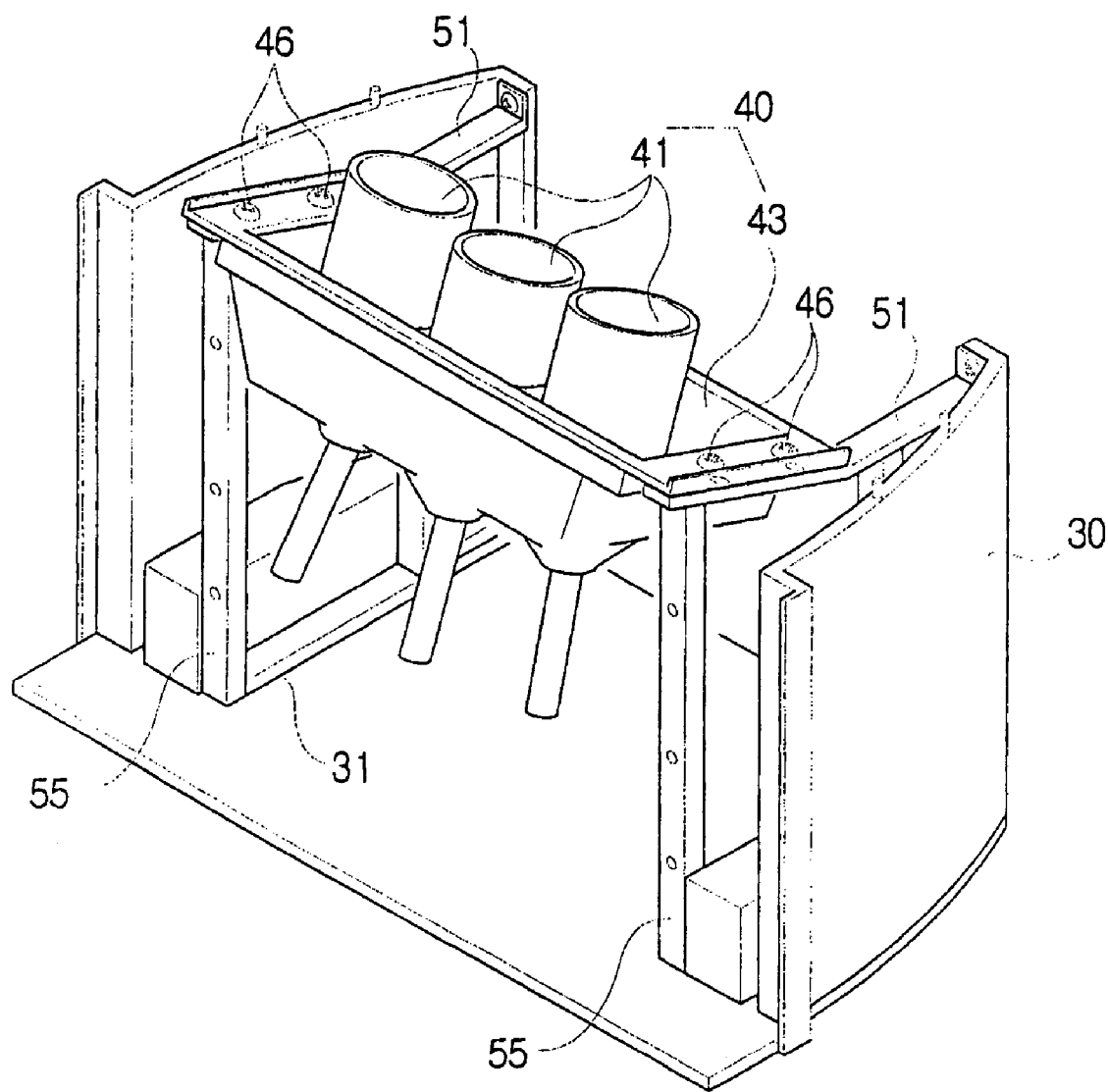
FIG. 5 is a partially combined perspective view of the projection television of FIG. 3.
Figure 6:
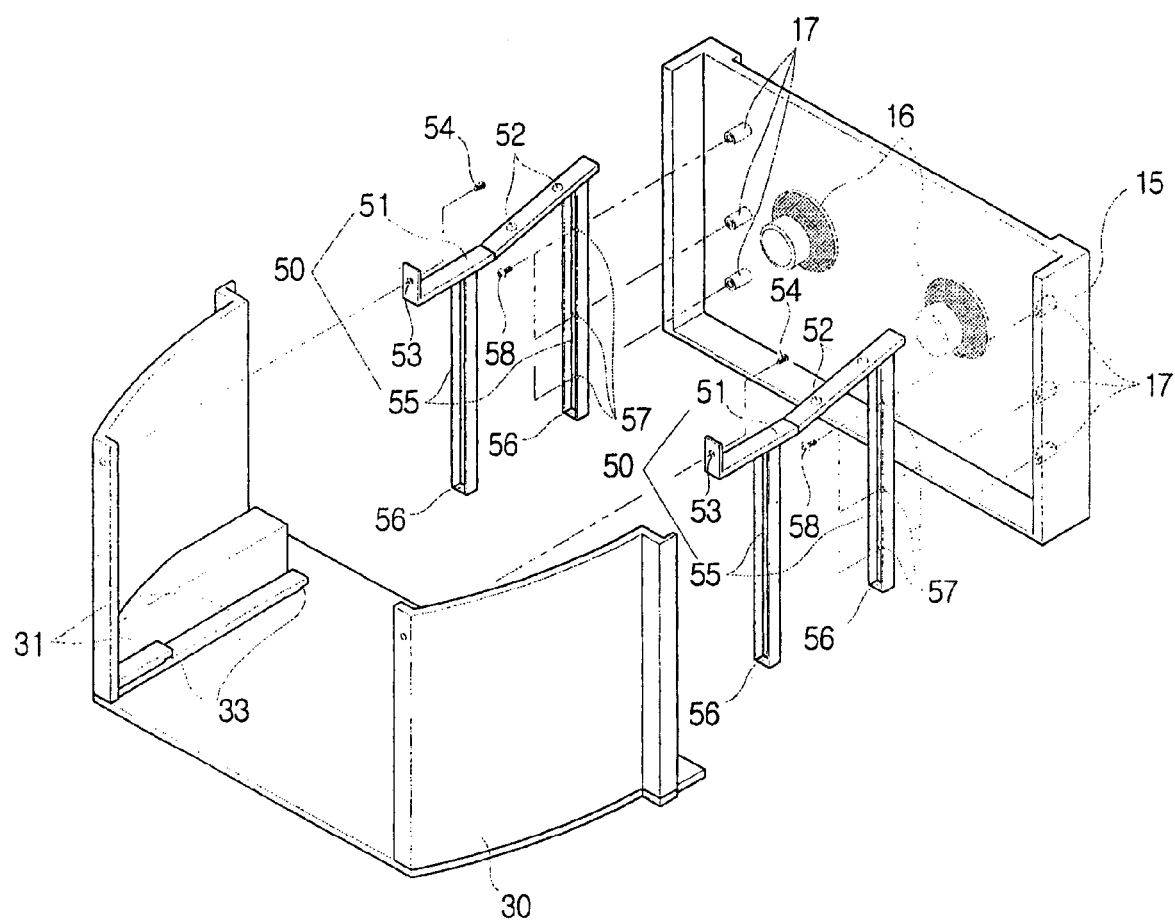
FIG. 6 is a partially exploded perspective view of the projection television of FIG. 3.

As shown in FIGS. 3 through 6, a projection television 1 according to the present invention has front and rear casings 10 and 20 forming an external appearance, a lower casing 30 provided between the front casing 10 and the rear casing 20, a CRT assembly 40 accommodated in the lower casing 30 and projecting image beams, a pair of CRT brackets 50 provided in the lower casing 30 and supporting the CRT assembly 40, a reflecting mirror 21 reflecting the image beams projected from the CRT assembly 40, a screen 12 mounted in the front casing 10 and displaying thereon pictures based on the image beams reflected by the reflecting mirror 21, a plurality of speakers 16 provided in the lower part of the front casing 10, and a circuit board 60 provided in the lower part of the lower casing 30 and controlling the CRT assembly 40.

The front casing 10 is provided in the front of the projection television 1 and includes an upper cover 11 that is provided on the top of the front casing 10, and is coupled to the front edge of the screen 12 to support the screen 12. The front casing 10 also includes a lower cover 15 provided in the lower part of the front casing 10 and has a plurality of speakers 16.

The lower cover 15 has a plurality of internally threaded first bosses 17 that combine with a plurality of bracket combining holes 57 of the CRT assembly 40 (to be described later) by third screws 58.

The rear casing 20 is provided in the rear of the projection television 1. Inside the rear casing 20 is a reflecting mirror 21 slantly installed to reflect the image beams projected from the CRT assembly 40, and transmit them to the screen 12. The top of the rear casing 20 is coupled to the upper cover 11 of the front casing 10 by screws or the like. The bottom of the rear casing 20 has a plurality of grooves 23 corresponding to a plurality of projections 35 on the top of the lower casing 30 (to be described later) to couple the lower casing 30 and the rear casing 20.

The lower casing 30 defines the lower sides and bottom external appearance of the projection television 1, and accommodates the circuit board 60 in the lower part thereof. The lower casing 30 is formed with: a pair of bracket supporting parts 31, each coupled to the CRT brackets 50 to support the CRT brackets 50; a plurality of internally threaded second bosses 37 formed in the rear of the lower casing 30 to couple the lower casing 30 with the CRT brackets 50; and a plurality of wheels 70 provided on the bottom of the lower casing 30 to facilitate mobility of the projection television 1. Additionally, the front edges of the lower casing 30 are combined to the lower cover 15 of the front casing 10 by screws or the like.

The lower casing 30 is preferably made of a plastic molding that can be inexpensively produced in commercial quantities. But the lower casing may be made of a conductive metallic material that is pressed or molded to block EMI (Electromagnetic Interference) from the circuit board 60 or other like materials.

The bracket supporting parts 31 have a stepped shape, and are provided on opposite sides of the lower casing 30. The bracket supporting parts 31 have fin grooves 33 corresponding to fins 56 formed in a lower end of a CRT supporting rib 55 of the CRT bracket 50 (to be described later).

The CRT assembly 40 includes a plurality of CRTs 41 projecting image beams, and a CRT frame 43 supporting and firmly accommodating the plurality of CRTs 41. The CRT frame 43 has a plurality of frame combining holes 45 to combine the CRT frame 43 to a CRT combination part 51 of the CRT bracket 50.

A pair of CRT brackets 50 are placed on opposite sides of the lower casing 30. Each CRT bracket 50 includes a CRT combination part 51 that connects to the CRT frame 43 of the CRT assembly 40, and a pair of CRT supporting ribs 55 that extend from the CRT combination part 51 and support the CRT combination part 51. The CRT bracket 50 supports the CRT assembly 40, and is made of a conductive metallic material to block EMI, and to discharge heat generated from the plurality of CRTs 41. Further, the CRT bracket 50 is connected to the circuit board 60, and blocks EMI generated from the circuit board 60 as well as the EMI generated from the CRT assembly 40. According to one aspect, the CRT bracket 50 is manufactured by pressing or molding.

An upper part of the CRT combination part 51 is formed with a plurality of CRT screw holes 52 corresponding to the frame combining holes 45 of the CRT frame 43, and is slantly bent in correspondence with a projecting angle of the image beam from the CRT assembly 40. According to one aspect, the CRT screw hole 52 is internally threaded and corresponds with a first screw 46. According to another aspect, a rear portion of the CRT combination part 51 has a casing combining hole 53 that combines with the second boss 37 located in the rear of the lower casing 20 using a second screw 54.

The pair of CRT supporting ribs 55 on the CRT bracket 50 are connected with the lower part of each CRT combination part 51. Further, the CRT supporting ribs 55 have fins 56 that are bent perpendicularly to a lengthwise direction of the CRT supporting ribs 55 and inserted in the fin grooves 33 of the bracket supporting part 31. Further, the CRT supporting ribs 55 have a plurality of bracket combining holes 57 combined to the first bosses 17 formed on the lower cover 15 of the front casing 10.

The projection television 1 is assembled as follows. First, the circuit board 60 is mounted on the bottom of the lower casing 30. Then, the pair of CRT brackets 50 is combined to the lower casing 30. At this time, the fin 56 formed in the CRT supporting rib 55 of the CRT bracket 50 is inserted in the fin groove 33 of the bracket supporting part 31 provided on the bottom opposite sides of the lower casing 30, and the casing combining hole 53 formed on the CRT combination part 51 of the CRT bracket 50 is combined with the second boss 37 formed in the rear of the lower casing 30 by means of the second screw 54.

Next, the CRT assembly 40 is combined to the pair of the CRT brackets 50. Then the frame combining hole formed on the CRT frame 43 of the CRT assembly 40 is combined to the CRT screw hole 52 formed on the CRT combination part 51 of the CRT bracket 50 by the first screw 46.

Then, the rear casing 20 provided with the reflecting mirror 21 is combined to the upper part of the lower casing 30. The groove 23 formed on the bottom of the rear casing 20 is then coupled to the projection 35 formed on the top of the lower casing 30, and the rear casing 20 is combined with the lower casing 30 by screws.

Next, the lower cover 15 of the front casing 10, provided with the plurality of speakers 16, is combined with the CRT assembly 40 and the lower casing 30. The first bosses 17 of the lower cover 15 are then combined with the bracket combining holes 57 formed on the CRT supporting rib 55 of the CRT bracket 50 by the third screw 58, and the edge of the lower cover 15 is combined to the lower casing 30 by screws.

Then, the upper cover 11 of the front casing 10, provided with the screen 12, is combined to the rear casing 20 by means of screws, and the wheels 70 are installed on the bottom of the lower casing 30.

In the foregoing embodiment, screws are used to combine the lower cover 15 and the lower casing 30, the the upper cover 11 and the rear casing 20, and the rear casing 20 and the lower casing 30. Detailed description of screws was omitted because the screw is well known. Other fasteners, however, may be substituted, such as hooks and hook holders, adhesives, bolts, rivets, and the like.

In the foregoing embodiment, the CRT bracket 50 is made of a conductive metallic material. According to one aspect, however, the CRT bracket may be made of plastic.

As described above, in a projection television according to the present invention, a CRT bracket to support a CRT assembly is provided in a lower casing, so that structure and weight of the projection television are respectively reduced and simplified, thereby facilitating transportation thereof and decreasing the costs of production and custody therefore.

Further, the CRT bracket to support the CRT assembly is made of a conductive metallic material, thereby reducing deformation or deterioration because of changes in temperature and humidity. This choice of material also dissipates heat generated from the CRT assembly more efficiently, and blocks EMI of the CRT assembly and the circuit board.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A projection television comprising a CRT assembly projecting image beams and first and second casings provided respectively on opposite sides of the CRT assembly the projection television, further comprising:
    a pair of CRT brackets, provided between the first and second casings, to support the CRT assembly, each CRT bracket comprising
        a CRT combination part, connected directly to the CRT assembly, and slantly disposed in correspondence with a projecting angle of the image beams from the CRT assembly, to project the image beams on a screen, and
        a CRT supporting rib, connected, at a first end of the CRT supporting rib, directly to a first side of the CRT combination part, to support the CRT combination part; and
    a third casing provided between the first and second casings, the third casing comprising a bracket supporting part connected directly to a second end of the CRT supporting rib opposite the first end of the CRT supporting rib,
    wherein each CRT bracket is connected directly to the third casing.

2. The projection television according to claim 1, wherein the CRT combination part comprises:
    a first screw hole,
    wherein the CRT combination part is connected directly to the CRT assembly using a first screw in combination with the first screw hole.

3. The projection television according to claim 2, wherein the CRT combination part further comprises:
    a second screw hole,
    wherein the CRT combination part is connected directly to the third casing using a second screw in combination with the second screw hole.

4. The projection television according to claim 1, wherein:
    the second end of the CRT supporting rib comprises a fin; and
    the bracket supporting part comprises a groove,
    wherein the bracket supporting part is connected to the second end of the CRT supporting rib by inserting the fin into the groove.

5. The projection television according to claim 1, wherein the CRT supporting rib is connected directly to the first casing.

6. The projection television according to claim 1, wherein the CRT bracket is made of a conductive material to block EMI.

7. The projection television according to claim 1, wherein the CRT bracket is made of plastic.

8. The projection television according to claim 1, wherein the third casing is made of a conductive material to block EMI.

9. The projection television according to claim 1, wherein the third casing is made of plastic.

10. A projection television comprising:
    a first casing, having a screen;
    a second casing, adjacent to the first casing;
    a CRT assembly projecting image beams; and
    a CRT bracket, connected directly to both the second casing and the CRT assembly to support the CRT assembly at an angle corresponding to a projection angle of the image beams, to project the image beams on the screen, the CRT bracket comprising
        a CRT supporting rib, and
        a CRT combination part, connected directly to both a first end of the CRT supporting rib and the CRT assembly,
    wherein a second end of the CRT supporting rib, opposite the first end of the CRT supporting rib, is connected directly to the second casing, and the CRT combination part is slantly disposed to support the CRT assembly at the angle corresponding to the projection angle of the image beams, and
    the CRT supporting rib is made of a conductive material to block EMI.

11. The projection television according to claim 10, wherein the second case comprises:
    a bracket supporting part,
    wherein the second end of CRT supporting rib is connected directly to the bracket supporting part.

12. The projection television according to claim 11, wherein:
    the second end of the CRT supporting rib has a fin that engages the bracket supporting part.

13. The projection television according to claim 10, wherein:
    the second casing is made of plastic.

14. The projection television according to claim 10, wherein:
    the second casing is made of a conductive material to block EMI.

15. The projection television according to claim 14, wherein:
    the second casing is molded.

16. The projection television according to claim 14, wherein:

the second casing is pressed.

17. The projection television according to claim 10, wherein:

the CRT supporting rib is made of plastic.

18. A projection television comprising:

a first casing, having a screen;

a second casing, adjacent to the first casing;

a CRT assembly protecting image beams; and a CRT bracket, connected directly to both the second casing and the CRT assembly to support the CRT assembly at an angle corresponding to a projection angle of the image beams, to project the image beams on the screen, the CRT bracket comprising a CRT supporting rib, and a CRT combination part, connected directly to both a first end of the CRT supporting rib and the CRT assembly, wherein a second end of the CRT supporting rib is connected directly to the second casing, and the CRT combination part is slantly disposed to support the CRT assembly at the angle corresponding to the projection angle of the image beams, and the CRT supporting rib has a u-shaped cross section.

* * * * *

UNITED STATES PATENT AND TRADEMARK OFFICE
CERTIFICATE OF CORRECTION

| | |
|---|---|
| PATENT NO. | : 7,011,416 B2 |
| APPLICATION NO. | : 10/652209 |
| DATED | : March 14, 2006 |
| INVENTOR(S) | : Nam-il Cho et al. |

It is certified that error appears in the above-identified patent and that said Letters Patent is hereby corrected as shown below:

On the title Page, ITEM, (75) Inventors, line 3, replace "Soon-woo" with --Seon-woo--, therefor;

line 4, replace "Suwon (JP)" with --Suwon (KR)--, therefor;

line 5, replace "Suwon (JP)" with --Suwon (KR)--, therefor;

Item [56] Other Publications, line 2, replace "pg" with --pg.--, therefor;

Column 7, line 10, claim 18, replace "protecting" with --projecting--, therefor.

Signed and Sealed this

Twenty-second Day of August, 2006

JON W. DUDAS
*Director of the United States Patent and Trademark Office*